United States Patent [19]

Barry

[11] Patent Number: 4,941,302

[45] Date of Patent: Jul. 17, 1990

[54] INSULATING DOUBLE GLAZED WINDOW ASSEMBLY

[75] Inventor: Christopher J. Barry, Perrysburg, Ohio

[73] Assignee: Libbey-Owens-Ford Co., Toledo, Ohio

[21] Appl. No.: 364,785

[22] Filed: Jun. 9, 1989

[51] Int. Cl.[5] ............................................... E04B 3/24
[52] U.S. Cl. ........................................ 52/171; 52/306; 52/308; 52/790; 428/34
[58] Field of Search ................ 52/171, 306, 307, 308, 52/788, 790, 791; 428/34, 192, 433; 156/104, 106, 99; 219/10.55 D, 121.12

[56] References Cited

U.S. PATENT DOCUMENTS

| | | | |
|---|---|---|---|
| 4,206,338 | 6/1980 | Katona | 219/10.55 D |
| 4,687,687 | 8/1987 | Terneu et al. | 428/34 |
| 4,831,799 | 5/1989 | Glover et al. | 52/171 X |

Primary Examiner—Richard E. Chilcot, Jr.
Attorney, Agent, or Firm—Marshall & Melhorn

[57] ABSTRACT

A multiple glass sheet insulating unit having a welded or fused glass, sealed peripheral edge. The unit comprises at least two glass sheets each having a low emissivity coating applied to a surface thereof. The sheets are disposed such that the hermetically sealed space between the sheets is of a width between 0.125 inch to 0.375 inch and the coating on one of the sheets faces the sealed space and the coating on the other sheet faces the ambient. A highly insulating gas such as krypton fills the sealed space.

10 Claims, 1 Drawing Sheet

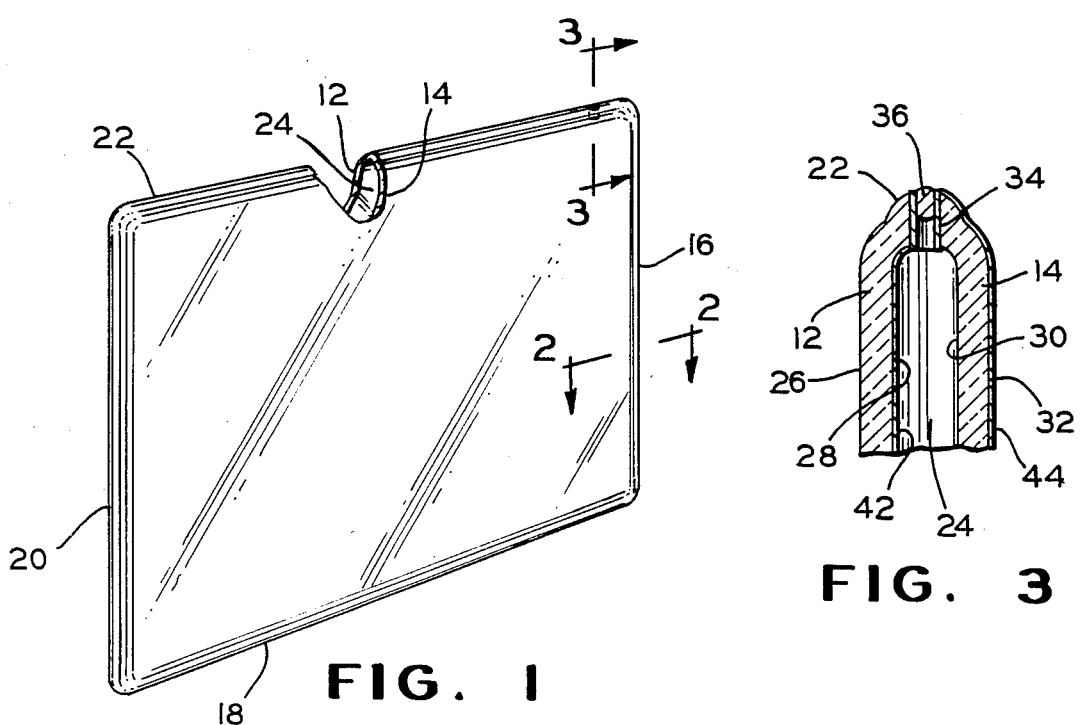
FIG. 1
FIG. 3
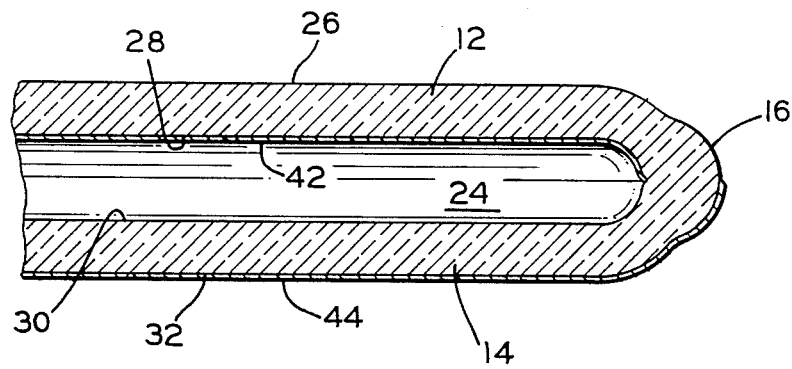
FIG. 2
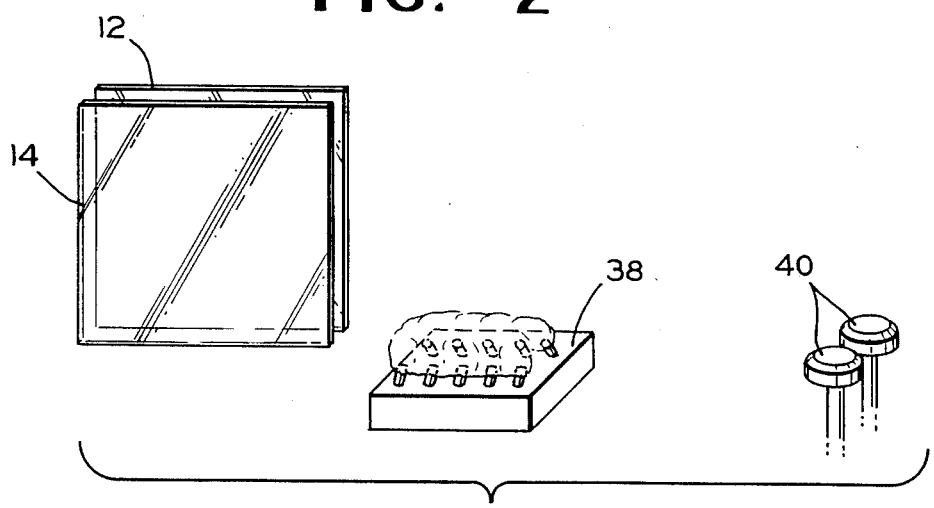
FIG. 4

INSULATING DOUBLE GLAZED WINDOW ASSEMBLY

BACKGROUND OF THE INVENTION

The invention relates to an insulating double glazed window assembly and more particularly to a gas filled, surface coated dual pane window assembly for greatly reducing thermal transfer therethrough.

The energy consumed in the heating and cooling of residential and commercial buildings can be efficiently conserved by employing insulating window units in the structure of the buildings. This is particularly true when the window units are those with coated surfaces which reflect, transmit, or absorb the energy as needed.

U.S. Pat. No. 4,081,934 to Franz discloses a seasonably adjustable window which includes four glass sheets mounted in spaced apart relationship and sealed at their marginal edges to provide dead airspaces therebetween. The outer glass sheets are selectively coated to provide the window with a shading coefficient of less than 0.20 in the summer position and greater than 0.25 in the winter position; and with a 50 percent reflectance to low temperature radiation in the winter position.

In U.S. Pat. No. 4,393,105 a method is taught for fabricating an insulating glass window comprising first assembling at least two panes of glass in spaced parallel relation to each other. The panes of glass are separated all around the edges by a metal spacer frame, and the frame is electrostatically bonded to its adjacent panes in the presence of heat and pressure. The hermetically sealed space between the two panes of glass is then evacuated so as to contain no moisture and oxygen and filled with a low heat-loss gas or left under vacuum.

U.S. Pat. No. 3,940,898 to Kaufman discloses a double pane window produced by placing two panes of transparent material in a spaced apart relationship and positioning sealing means about the periphery of the adjacent faces of the panes to enclose a sealed area which is then filled with a dry gas. The window is then mounted in a suitable frame to maintain the panes of transparent material in an acceptable spaced apart relationship.

U.S. Pat. No. 4,485,603 teaches an insulating window structure having an inner glass pane spaced from an outer glass pane by a spacer frame extending around the panes so that the panes define between them, within the frame, a gas filled space.

The objective of the present invention is to provide a welded glass sealed edge insulating double pane window assembly capable of a long lasting air/gas seal between the two panes of glass.

A further objective of the present invention is to provide an insulating double glazed window assembly with a low thermal conductivity, i.e. U-Value, through the means of low emissivity (low E) coatings and gas filling of the air space between window panes.

SUMMARY OF THE INVENTION

The present invention relates broadly to an insulating double glazed window assembly, and more particularly to an insulating double glazed window assembly having a welded glass sealed edge and low thermal conductivity.

The present invention involves coating two sheets of glass by a sputtering technique or pyrolytically with a metal oxide coating to form hard low-emissivity coatings thereon. The coatings have a high visible light transmission (greater than 50%) and hemispherical emissivities of less than 0.40. The coatings alter the transmission of infrared radiant energy without adversely affecting other properties visible to the naked eye such as transmitted and reflected color.

The two coated sheets of glass are then supported in spaced face-to-face parallel relation and the marginal edge portions of the coated glass sheets are heated to softening temperature and then passed between a pair of forming rolls which urge said edge portions together into fused contact with one another to form a continuous sealed peripheral edge wall around the unit. As this operation continues around the periphery of the two coated sheets of glass, an air space is formed therebetween. This air space must then subsequently be dehydrated and hermetically sealed to provide the desired insulating and condensation preventing qualities of such units.

Communication with the air space is maintained by the use of at least one tubular metal insert or grommet which is sealed into the edge wall of the unit as the edge portions of the coated glass sheets are fused together to provide a dehydration hole. The normal moisture containing air is then flushed from the interior of the double glazed window assembly through the tubular insert and replaced with a highly insulating gas. The gas used provides a high insulation for the small gap between the coated sheets of glass due to it being denser than air. The double glazed window assembly is then hermetically sealed by plugging or otherwise closing the hole in the metal insert.

BRIEF DESCRIPTION OF THE DRAWINGS

The above objects and advantages of the invention will become manifest to one skilled in the art from considering the following detailed description of an embodiment of the invention in light of the accompanying drawings in which:

FIG. 1 is a perspective view of an insulating double glazed window assembly in accordance with the present invention;

FIG. 2 is an enlarged sectional view taken along line 2—2 in FIG. 1;

FIG. 3 is an enlarged sectional view taken along line 3—3 in FIG. 1; and

FIG. 4 is a diagrammatic view of apparatus for producing an insulating double glazed window assembly having sealed edge walls.

DESCRIPTION OF THE PREFERRED EMBODIMENT

Referring now to the drawings the window assembly 10 in accordance with the present invention comprises an outboard coated sheet of glass 12, and an inboard coated sheet of glass 14 spaced from one another in face-to-face parallel relation by edge wall portions 16, 18, 20 and 22 to create an air space 24 therebetween. For purposes of reference, the surfaces of the glass sheets 12 and 14 are typically designated as first through fourth surfaces. Thus, the outer surface 26 of the outboard glass sheet 12 is designated the number one or first surface. The inner surface 28 of the outboard glass sheet 12 is designated the number two or second surface. The inner surface 30 of the inboard glass sheet 14 is designated the number three or third surface, and the outer surface 32 of the inboard glass sheet 14 is designated the number four or fourth surface.

As indicated by the numeral 34 in FIG. 3, at least one of the wall portions, such as 22, is provided with at least one tubular metal insert or grommet 34 that is sealed into the said edge wall as it is being formed. This tubular metal insert 34 forms an access hole into the air space 24 for dehydration and also allows for filling of the air space 24 with a gas. In accordance with the present invention, the air space 24 is dehydrated and filled with an insulating gas such as krypton gas for example, and the insert 34 is then closed by a plug or body of solder 36 to hermetically seal the unit.

It is recognized in the teaching of U.S. Pat. No. 3,027,607 that the tubular metal insert 34 can be formed from certain metals, or alloys of such metals, having thermal expansion characteristics compatible with those of the composition of the glass sheets. Thus, metal inserts of nickel-iron and nickel iron-cobalt alloys, by way of example, have been satisfactorily employed.

Multiple sheet glazing units of the type shown in FIGS. 1 and 2 have been produced according to the method and apparatus disclosed in U.S. Pat. No. 3,257,187, the pertinent portions of which are diagrammatically illustrated in FIG. 4. Thus, a pair of glass sheets 12 and 14 supported in spaced face-to-face parallel relation, are carried through the concentrated heat of fusing burners 38 which progressively soften the marginal edge portions of the sheets until they are substantially semi-plastic. The heat softened edge portions are then passed between a pair of forming rolls 40 which urge said edge portions together into fused contact with one another to produce a sealed peripheral edge wall. During the formation of at least one edge wall portion, the metal insert 34, if used, is accurately introduced into position between the highly-heated marginal portions of the sheets 12 and 14 and, with the pressure exerted by the forming rolls 40, is sealed into the edge wall.

Prior to the assembly process of the of the window assembly 10, the glass sheets 12 and 14 are pyrolytically coated with a metal oxide. The pyrolytic coating process typically involves applying a solution, vapor or powder of a metal oxide film forming composition in an oxidizing atmosphere to a surface of a glass sheet. As examples of such coatings and methods of applying same. reference is made to U.S. Pat. Nos. 3,660,061, 4,206,252 and 4,642,130. The use of pyrolytic coatings in the present invention, allows for these coatings located in the vision areas of the glazing not to be destroyed by the heat of the fusing burners 38 during the assembly process of the window assembly 10, thereby allowing the outer as well as the inner surfaces of the window assembly to be coated.

In the preferred embodiment, a pyrolytic coating 42 is applied to the inner surface 28 of the outboard glass sheet 12, and a second pyrolytic coating 44 is applied to the outer surface 32 of the inboard glass sheet 14. The pyrolytic coatings 42 and 44 are selected for low emissivity, i.e. a hemispherical emissivity of less than 0.40. and preferably less than 0.25, and for high visible light transmission, i.e greater than 50%. The U-value is defined as the overall coefficient of heat transmission or thermal transmittance (air to air) in BTU/hour square foot-degree F. U-values are determined in accordance to the teachings of Chapter 22 of ASHRAE Handbook of Fundamentals published in 1972, which teachings are hereby incorporated as reference. It should be noted that low emissivity coatings applied by sputtering techniques may also be used to achieve the desired emissivity values (less than 0.40) and visible light transmission (greater than 50%) for each pane but great care must be taken in the assembly process not to destroy the coatings. Sputtered coatings such as a six-layered film stack comprised of $TiO_2$, $ZnO-SnO_2$, $TiO_2$, Ag, $TiO_2ZnO-SnO_2$, for example, or the coatings disclosed in U.S. Pat. No. 4,548,691 and EPO No. 219 273 provide the desired emissivity and light transmittance characteristics.

During the formation of the window assembly 10 the dimension of the gas space 24 is controlled to maintain a distance of 0.125 inch to 0.375 inch between the outboard glass sheet 12 and the inboard glass sheet 14 with a preferred separation of approximately 0.25 inch. This range of distance between the outboard glass sheet 12 and the inboard glass sheet 14 is critical if one is to obtain the benefits of the invention due to a smaller gas space having poor thermal insulation (greater U-value), and a larger air space increasing the risk of glass breakage due to air/gas space temperature and pressure variations. The distance between the glass sheets 12 and 14 is narrower than that which is normally used in the construction of air filled units. Typically, a gap of 0.5 inch is needed for air filled units. The reason for the narrower distance is the U-value of the window assembly 10 is further decreased by the filling of the air space 24 with a gas such as krypton, for example. The use of highly insulating gases such as krypton, argon, and freon provides decreased heat transfer through the window assembly. The utilization of krypton gas in the gas space 24 of the present invention provides for high insulation within a smaller than normal gap, due to the krypton being greatly less thermally conductive than air.

Typically, after construction of the window assembly 10, the air space 24 is purged of the air within same and then dehydrated to remove moisture through the insert 34. Following the purging and dehydration of the air space 24, an inert gas, preferably krypton gas, is pressure fed into the air space 24, thereby filling same with krypton. The insert 34 is then closed by a plug or body of solder 36 to hermetically seal the window assembly 10. Depending on the use of the window assembly 10, it may be found advantageous to employ two metal inserts 34 located in one edge wall portion or in oppositely disposed edge wall portions.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An insulating window assembly, said window assembly comprising:
   (a) at least first and second sheets of glass spaced from one another at a width of 0.125 inch to 0.375 inch in face-to-face parallel relation, said first and second sheets of glass having opposed inwardly facing surfaces and outwardly facing surfaces;
   (b) fused marginal edges wherein said first and second glass sheets are attached to one another.,
   (c) at least one sealed air space, said air space disposed between said first and second glass sheets and filled with a gas; and
   (d) a coating with low emissivity and high visible light transmittance applied to at least one inwardly facing surface of one of said glass sheets and applied to the outwardly facing surface of the other of said glass sheets 2. An insulating window assembly as defined in claim 1, wherein said gas is krypton.

3. An insulating window assembly as defined in claim 1, wherein said coating is a pyrolytic coating.

4. An insulating window assembly as defined in claim 1, wherein said coating is a sputtered coating.

5. An insulating window assembly as defined in claim 1, wherein said emissivity is 0.40 or less.

6. An insulating window assembly as defined in claim 1, wherein said high visible light transmittance is greater than 50%.

7. An insulating window assembly as defined in claim 1, wherein said first and second glass sheets are spaced at a width of approximately 0.25 inch.

8. An insulating window assembly, said window assembly comprising:
 (a) at least first and second sheets of glass spaced from one another at a width of 0.125 inch to 0.375 inch in face-to-face parallel relation, said first and second sheets of glass having opposed inwardly facing surfaces and outwardly facing surfaces;
 (b) fused marginal edges wherein said first and second glass sheets are attached to one another;
 (c) a sealed air space disposed between said first and second glass sheets, said air space filled with krypton gas; and
 (d) a pyrolytic coating with low emissivity and high visible light transmittance applied to at least one inwardly facing surface of one of said glass sheets and applied to the outwardly facing surface of the other of said glass sheets.

9. An insulating window assembly as defined in claim 8, wherein said emissivity is 0.40 or less.

10. An insulating window assembly as defined in claim 8, wherein said high visible light transmittance is greater than 50%.

* * * * *